United States Patent [19]
Furukawa

[11] Patent Number: 5,496,665
[45] Date of Patent: Mar. 5, 1996

[54] HYDROGEN-OCCLUSION-ALLOY ELECTRODE

[75] Inventor: Jun Furukawa, Iwaki, Japan

[73] Assignee: Furukawa Denchi Kabushiki Kaisha, Yokohama, Japan

[21] Appl. No.: 293,847

[22] Filed: Aug. 22, 1994

[30] Foreign Application Priority Data

Aug. 25, 1993 [JP] Japan .................. 5-210072

[51] Int. Cl.$^6$ .................. H01M 4/62; H01M 4/52
[52] U.S. Cl. .................. 429/232; 429/223
[58] Field of Search .................. 429/232, 223

[56] References Cited

U.S. PATENT DOCUMENTS

| | | | |
|---|---|---|---|
| 3,658,591 | 4/1972 | Fukuda et al. | 429/223 |
| 4,514,473 | 4/1985 | Atkin et al. | 429/10 |
| 4,663,256 | 5/1987 | Corrigan | 429/223 |
| 5,004,657 | 4/1991 | Yoneda et al. | 429/193 |

FOREIGN PATENT DOCUMENTS

| | | |
|---|---|---|
| 0206776 | 12/1986 | European Pat. Off. . |
| 0277332 | 8/1988 | European Pat. Off. . |
| 0284063 | 9/1988 | European Pat. Off. . |
| 0574019 | 12/1993 | European Pat. Off. . |
| 0581275 | 2/1994 | European Pat. Off. . |

OTHER PUBLICATIONS

Patent Abstracts of Japan, vol. 18, No. 238 (E–1544), 6 May 1994 of JP–A–06 029 018 (Furukawa Battery Co., Ltd.), 4 Feb. 1994.
Patent Abstracts of Japan, vol. 17, No. 173 (E–1345) 2 Apr. 1993 of JP–A–04 328 252 (Furukawa Battery Co., Ltd.), 17 Nov. 1992.
Patent Abstracts of Japan, vol. 14, No. 580 (E–1017), 25 Dec. 1994 of JP–A–02 252 558 (Japan Storage Battery Co., Ltd.) 12 Oct. 1990.
Patent Abstracts of Japan, vol. 15, No. 428 (E–1128) 30 Oct. 1991 of JP–A–03 179 664 (Furukawa Battery Co., Ltd.), 5 Aug. 1991.
Database WPI, Week 9351, Derwent Publications Ltd., London, GB, AN 93–411120, of JP–A–5 311 201 (Furukawa Battery Co., Ltd.), 22 Nov. 1993.
Database WPI, Week 7846, Derwent Publications Ltd., London, GB, AN 78–82790A of JP–A–53 115 688 (GH Tokai Daigaku), 9 Oct. 1978.
Database WPI, Week 9215, Derwent Publications Ltd., London, GB, AN 92–119561 of JP–A–4 062 753 (Furukawa Battery KK), 27 Feb. 1992.

*Primary Examiner*—Stephen Kalafut
*Assistant Examiner*—Richard H. Lilley, Jr.
*Attorney, Agent, or Firm*—Frishauf, Holtz, Goodman, Langer & Chick

[57] ABSTRACT

A hydrogen-occlusion-alloy electrode comprises a current collector on which an active material mixture is supported, wherein the active material mixture contains hydrogen-occlusion-alloy powder, a binding agent and an electrically conductive material as essential components, and the electrically conductive material consists of powder containing carbon and nickel as essential components and has a carbon content of 0.2 to 3% by weight. The hydrogen-occlusion-alloy electrode is incorporated in a battery and restrains the internal pressure of the battery from rising when the battery is overcharged.

5 Claims, 1 Drawing Sheet

F I G. 1
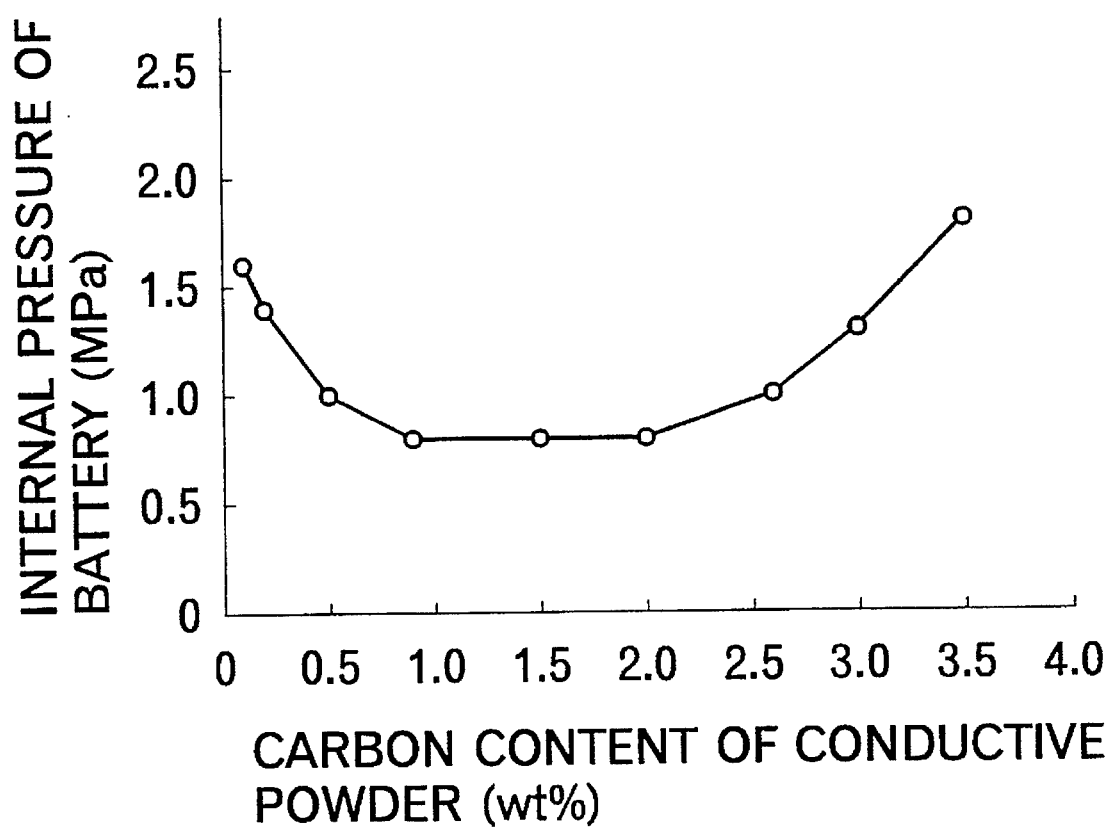

HYDROGEN-OCCLUSION-ALLOY ELECTRODE

BACKGROUND OF THE INVENTION

1. Field of the Invention

The present invention relates to a hydrogen-occlusion-alloy electrode for use as a negative electrode of an alkaline storage battery such as a nickel-hydrogen storage battery, and more particularly, to a hydrogen-occlusion-alloy electrode capable of restraining the internal pressure of a battery from rising when the battery is overcharged, thereby prolonging a cycle life of the battery.

2. Description of the Related Art

A nickel-hydrogen storage battery is recently attracting attention as a high-capacity battery. The nickel-hydrogen storage battery has a negative electrode, which is a hydrogen-occlusion-alloy electrode comprising a hydrogen-occlusion-alloy supported on a current collector, and a positive electrode comprising a nickel hydroxide as a positive electrode active material supported on a current collector, and uses an alkaline solution as the electrolyte.

One of conventionally known hydrogen-occlusion-alloy electrodes for use in this type of storage battery is produced by mixing powder of a hydrogen-occlusion-alloy, which is capable of reversible occlusion and release of hydrogen, with powder of a binding agent, such as polytetrafluoroethylene powder, polyethylene powder or polypropylene powder, and then molding the mixture into a sheet. Another hydrogen-occlusion-alloy electrode known in the art is produced by applying or filling a hydrogen-occlusion-alloy to or in a current collector, which is an electrically conductive meshed sheet or perforated metal sheet having a desired rate of hole area, so that the current collector carries the hydrogen-occlusion-alloy thereon.

Of these two electrodes, the latter electrode is generally produced as described below.

First, a slurry containing hydrogen-occlusion-alloy powder is prepared in the following manner: A predetermined amount of hydrogen-occlusion-alloy powder having a predetermined particle diameter is dispersed in an aqueous solution of thickener, which is prepared by dissolving a predetermined amount of one or more thickeners such as methyl cellulose, carboxymethyl cellulose, polyethylene oxide and polyvinyl alcohol in ion-exchange water or distilled water. At this time, in order to increase the binding force between the particles of the hydrogen-occlusion-alloy powder to be supported on the current collector and thereby prevent the alloy powder from peeling off the collector, a suitable amount of binder powder, such as polytetrafluoroethylene powder, polyethylene powder, polypropylene powder and polyvinylidene fluoride powder, is added to the solution. Further, a suitable amount of conductive powder, such as cobalt powder, copper powder and carbon powder, is added to the solution, to increase the electrical conductivity of the hydrogen-occlusion-alloy so that the alloy supported on the current collector has enhanced current collecting capability as the negative electrode.

A current collector, which is a perforated nickel sheet or a nickel net, for example, is immersed in the slurry prepared as described above, and then is drawn up at a predetermined rate so that the slurry is filled in and supported on the current collector.

Subsequently, the slurry supported on the current collector is dried, and then the sheet or net with the dried slurry is rolled under a predetermined pressure to control the thickness of the dried slurry layer to a predetermined thickness and also to make the slurry layer closely adhere to the current collector, thereby obtaining a hydrogen-occlusion-alloy electrode.

In the case where polyvinylidene fluoride powder is used as the binding agent, after the above rolling step the whole structure is baked in a nitrogen atmosphere or in vacuum at a temperature of 150 to 210° C., for example, to thereby soften the binding agent so that the binding agent is firmly combined together.

When a nickel-hydrogen storage battery is charged, the positive electrode thereof generates oxygen gas. The oxygen gas thus generated is reduced to water as it reacts with hydrogen occluded in the negative electrode.

Generally, however, a potential at which charging reaction of the hydrogen-occlusion-alloy takes place is close to an electrolytic potential of water, and accordingly, when the battery is overcharged, a large quantity of hydrogen gas is produced due to the electrolysis of water constituting the electrolyte. Consequently, the gas pressure of the hydrogen gas rises, increasing the internal pressure of the battery. In fact, the hydrogen gas accounts for about 90% of the gases exerting the internal pressure of the battery.

Usually, in the nickel-hydrogen storage battery, when the internal pressure exceeds 1.5 MPa, a safety valve built in the battery operates so as to release the internal gases. If this operation repeatedly takes place, however, the amount of the electrolyte gradually decreases, shortening the life of the battery.

Increase in the internal pressure can be controlled to some extent by increasing the capacity of the negative electrode. Increasing the capacity of the negative electrode, however, is not desirable in the light of the demand for batteries with a higher energy density.

OBJECTS AND SUMMARY OF THE INVENTION

An object of the present invention is to provide a hydrogen-occlusion-alloy electrode which is incorporated in an alkaline storage battery and is capable of restraining the internal pressure of the battery from rising when the battery is overcharged.

To achieve the above object, the present invention provides a hydrogen-occlusion-alloy electrode comprising a current collector on which an active material mixture is supported, wherein the active material mixture contains hydrogen-occlusion-alloy powder, a binding agent and an electrically conductive material as essential components, and the electrically conductive material consists of powder containing carbon and nickel as essential components and has a carbon content of 0.2 to 3% by weight.

BRIEF DESCRIPTION OF THE DRAWING

FIG. 1 is a graph showing the relationship between the carbon content of an electrically conductive material and the internal pressure of a battery.

DETAILED DESCRIPTION OF THE PREFERRED EMBODIMENTS

A hydrogen-occlusion-alloy electrode according to the present invention contains, as essential components, hydrogen-occlusion-alloy powder, a binding agent and an electrically conductive material, and is characterized in that the conductive material consists of powder in which nickel and carbon are mixed in a predetermined ratio.

Specifically, the conductive material may be carbonyl nickel powder having a carbon content of 0.2 to 3% by weight, or a mixture of powders prepared by mixing 0.2 to 3% by weight of carbon powder in pure nickel powder.

The carbonyl nickel powder has a three-dimensional chain structure, like the structure of carbon black, and is produced by thermally decomposing nickel carbonyl as a raw material. The content of residual carbon can be controlled to the aforementioned range by suitably selecting the loading of nickel carbonyl and the temperature for thermal decomposition.

The function of carbon contained in the conductive material is not specifically known, but it is considered that, where nickel and carbon coexist, carbon acts as a catalyst for accelerating the reaction (reduction to water) to combine oxygen, generated from a positive electrode during an overcharged state, with hydrogen occluded in the hydrogen-occlusion-alloy. It is also considered that carbon serves to restrain a negative electrode from being oxidized by the oxygen generated as aforesaid, thereby restraining generation of hydrogen from the negative electrode as a result of an increase in overvoltage caused due to the oxidation of the negative electrode.

If the carbon content of the conductive material is smaller than 0.2% by weight, the aforementioned effects of carbon are not achieved, and the internal pressure of a battery, which uses as the negative electrode a hydrogen-occlusion-alloy electrode produced using powder of such conductive material, rises up to 1.5 MPa or more when the battery is overcharged. On the other hand, if the carbon content is greater than 3% by weight, the volume ratio of carbon with respect to the whole conductive powder is too great, since the specific gravity of carbon is about 1.5 $g/cm^3$ and that of nickel is about 7.8 $g/cm^3$. Consequently, the function of nickel is not fully obtained, with the result that the internal pressure of the battery rises when the battery is overcharged, as in the above case. Thus, in cases where the carbon content is outside the aforementioned range, the internal pressure of the battery rises when the battery is overcharged.

Where carbonyl nickel powder is used as the conductive material, the particle diameter thereof as measured by the Fisher method should preferably be 1.5 μm or less. In the case where a mixture of pure nickel powder and carbon powder is used for the conductive material, the powders are each preferably reduced to 1 μm or less in particle diameter before being mixed.

The hydrogen-occlusion-alloy electrode according to the present invention can be produced as follows:

First, hydrogen-occlusion-alloy powder having a predetermined particle diameter, the aforesaid electrically conductive powder, and powder of a binding agent are dispersed, in respective predetermined quantities, in a thickener aqueous solution prepared by dissolving a predetermined amount of a thickener in ion-exchange water or distilled water, to obtain a slurry.

For the thickener, methyl cellulose, carboxymethyl cellulose, polyethylene oxide, polyvinyl alcohol, etc., can be used, as in conventional hydrogen-occlusion-alloy electrodes. Any one of these substances may be used singly, or two or more of them may be mixed for use.

As the binding agent, polytetrafluoroethylene powder, polyethylene powder, polypropylene powder, polyvinylidene fluoride powder, etc., can be used, as in conventional hydrogen-occlusion-alloy electrodes. Any one of these substances may be used singly, or two or more of them may be mixed for use.

When preparing the slurry, if the amount of the conductive powder is too small, the produced hydrogen-occlusion-alloy electrode has poor electrical conductivity and thus is degraded as the negative electrode due to low current collecting capability. If the amount of the conductive powder is too large, the amount of the hydrogen-occlusion-alloy powder supported on the negative electrode becomes relatively small, and the discharge capacity of the assembled battery lowers. If the amount of the binding agent is too small, the hydrogen-occlusion-alloy powder is liable to peel off the current collector. On the other hand, if the amount of the binding agent is too large, the amount of the hydrogen-occlusion-alloy powder adhering to the negative electrode becomes relatively small and the discharge capacity of the assembled battery lowers, as in the case where the amount of the conductive powder is too large. Further, the surface of the hydrogen-occlusion-alloy powder is covered with excess binding agent, causing a rise in the internal pressure of the battery when the battery is overcharged.

Usually, 1 to 20 parts by weight of the conductive powder and 0.3 to 5 parts by weight of the binding agent are preferably mixed in 100 parts by weight of the hydrogen-occlusion-alloy powder. More preferably, the contents of the conductive powder and binding agent are 2 to 15 parts by weight and 0.4 to 3 parts by weight, respectively, with respect to 100 parts by weight of the hydrogen-occlusion-alloy powder.

Subsequently, a current collector having a large number of holes therein, such as a perforated nickel sheet or a nickel net, is immersed in the slurry prepared in the above-described manner and then drawn up therefrom, whereby the slurry is attached to and filled in the current collector.

The slurry attached to the current collector is then dried, and the current collector with the dried slurry is rolled under a predetermined pressure (normally 0.5 to 4 $ton/cm^2$), to control the thickness of the dried slurry and that of the collector to respective predetermined thicknesses, and also to make the dried slurry closely adhere to the current collector so that the former may not peel off the latter. After this, the rolled current collector is baked, for example, in a nitrogen atmosphere at a predetermined temperature (normally 140 to 200° C.), to firmly combine the alloy powder and the conductive powder together by the binding agent, thereby obtaining a hydrogen-occlusion-alloy electrode.

Example 1

Using an arc melting method, a hydrogen-occlusion-alloy, the composition of which is represented by $MmNi_{3.3}Co_{1.0}Mn_{0.4}Al_{0.3}$ (Mm denotes misch metal), was produced and the ingot thereof was crushed into powder of 150 mesh or less (Tyler sieve).

Then, a thickener aqueous solution was prepared by dissolving 1% by weight of carboxymethyl cellulose in ion-exchange water, and 250 g of the solution thus prepared was poured into each of vessels. Subsequently, in each vessel containing 250 g of the solution were added 1000 g of the aforesaid hydrogen-occlusion-alloy powder, 150 g of carbonyl nickel powder having a particle diameter of about 0.7 μm as measured by the Fisher method but having a different carbon content, and 30 g of polyvinylidene fluoride powder having an average particle diameter of 3 μm. Each solution with the powders therein was stirred well to obtain a slurry.

A perforated nickel sheet having a thickness of 0.07 mm and a rate of hole area of 38% (hole diameter: 1.5 mm) was immersed in each slurry and then drawn up therefrom. The slurry attached to the nickel sheet was dried in the air, and the resulting sheet was rolled under a pressure of 2 ton/cm$^2$ and then baked in a nitrogen atmosphere at 170° C. for one hour, thereby obtaining a negative electrode sheet (hydrogen-occlusion-alloy electrode).

Also, a spongy nickel sheet, which was 1.1 mm thick and had a porosity of 94%, was filled with an active material mixture which was prepared by adding a carboxymethyl cellulose aqueous solution of a 1% concentration to a mixed powder consisting of 93% by weight of $Ni(OH)_2$ powder and 7% by weight of CoO powder. The sheet was dried at 100° C. for two hours and then rolled under a pressure of 1 ton/cm$^2$, thereby obtaining a positive electrode sheet. The filling quantity of the active material was 3.6 g.

A nylon separator of 0.18 mm thick was interposed between the positive electrode sheet and the negative electrode sheet, and the entire assembly was wound into a roll to obtain a power generating element having a diameter of about 13 mm. Each element was housed in a cylindrical container which was made of iron plated with nickel and which had an inner diameter of 13.2 mm. A KOH aqueous solution having a specific gravity of 1.37 was poured into each container and the container was covered with a lid. In this manner, enclosed cylindrical batteries with a rated capacity of 1000 mAh were produced.

Each of the batteries was overcharged under the condition indicated below and the internal pressure thereof was measured.

Charge: 1 C, 4.5 hours; Temperature: 20° C.

The results are shown in FIG. 1, which illustrates the relationship between the carbon content (wt %) of carbonyl nickel powder and the battery internal pressure (MPa).

As is clear from FIG. 1, the internal pressures of those batteries which are provided with the hydrogen-occlusion-alloy electrode produced using carbonyl nickel powder with a carbon content of 0.2 to 3% by weight as the conductive material are lower than 1.5 MPa.

What is claimed is:

1. A hydrogen-occlusion-alloy electrode comprising:

a current collector on which an active material mixture is supported, said active material mixture containing hydrogen-occlusion-alloy powder, a binding agent and an electrically conductive material as essential components, said electrically conductive material is carbonyl nickel powder having a carbon content of 0.2 to 3% by weight.

2. The hydrogen-occlusion-alloy electrode according to claim 1, wherein said binding agent comprises at least one powder selected from the group consisting of polytetrafluoroethylene powder, polyethylene powder, polypropylene powder and polyvinylidene fluoride powder.

3. The hydrogen-occlusion-alloy electrode according to claim 1, wherein said active material mixture contains 0.3 to 5 parts by weight of said binding agent and 1 to 20 parts by weight of said electrically conductive material, with respect to 100 parts by weight of the hydrogen-occlusion-alloy powder.

4. The hydrogen-occlusion-alloy electrode according to claim 2, wherein said active material mixture contains 0.3 to 5 parts by weight of said binding agent and 1 to 20 parts by weight of said electrically conductive material, with respect to 100 parts by weight of the hydrogen-occlusion-alloy powder.

5. The hydrogen-occlusion-alloy electrode according to claim 1 wherein the carbon content is 1%–2% by weight.

* * * * *